(12) United States Patent
Cleary et al.

(10) Patent No.: US 9,037,494 B2
(45) Date of Patent: May 19, 2015

(54) METHOD AND SYSTEM OF MANAGING SUBSCRIBER ACCESS TO SERVICES ASSOCIATED WITH SERVICES PROVIDER

(75) Inventors: David Cleary, Glen Mills, PA (US); Walter Michel, Glenside, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 1988 days.

(21) Appl. No.: 11/719,047

(22) PCT Filed: Sep. 13, 2005

(86) PCT No.: PCT/US2005/032567
§ 371 (c)(1),
(2), (4) Date: May 22, 2007

(87) PCT Pub. No.: WO2006/031812
PCT Pub. Date: Mar. 23, 2006

(65) Prior Publication Data
US 2008/0141137 A1    Jun. 12, 2008

Related U.S. Application Data

(60) Provisional application No. 60/609,384, filed on Sep. 13, 2004.

(51) Int. Cl.
*G06Q 30/00* (2012.01)
*H04N 7/16* (2011.01)
*H04N 21/472* (2011.01)
*G06Q 30/06* (2012.01)
*H04N 7/173* (2011.01)
(Continued)

(52) U.S. Cl.
CPC ....... *H04N 21/472* (2013.01); *H04N 21/47202* (2013.01); *G06Q 30/0601* (2013.01); *H04N 21/4126* (2013.01); *H04N 7/17318* (2013.01); *H04N 21/25808* (2013.01)

(58) Field of Classification Search
CPC .......... G06Q 30/0601; G06Q 30/0641; G06Q 30/0633; G06Q 30/0635; G06Q 30/063; H04N 7/17318; H04N 7/17309; H04N 7/165; H04N 7/163; H04N 21/47202; H04N 2/4126; H04N 21/4126; H04N 5/4401
USPC ............... 705/26, 27, 26.1, 27.1, 26.8, 26.81; 725/1, 86, 87, 100, 104, 105, 135, 139, 725/141, 143, 151, 153
See application file for complete search history.

(56) References Cited

U.S. PATENT DOCUMENTS

| | | |
|---|---|---|
| 5,446,489 A | 8/1995 | Egendorf |
| 5,559,548 A | 9/1996 | Davis et al. |

(Continued)

OTHER PUBLICATIONS

Anon., "Liberate Technologies: Liberate Technologies announces availability of Liberate TV Platform Standard 1.3; Software suite for enhanced TV offers new features for unmatched consumer services management and reduced time for deployment," M2 Presswire, Apr. 26, 2001.*

(Continued)

*Primary Examiner* — Nicholas D Rosen
(74) *Attorney, Agent, or Firm* — Banner & Witcoff, Ltd.

(57) ABSTRACT

Method and system of managing subscriber access to services. The method and system including features for use in determining subscriber entitlements to the services and managing presentation of the services for subscriber selection and access as a function of the subscriber entitlements.

20 Claims, 1 Drawing Sheet

(51) Int. Cl.
*H04N 21/258* (2011.01)
*H04N 21/41* (2011.01)

(56) References Cited

U.S. PATENT DOCUMENTS

| | | | |
|---|---|---|---|
| 6,178,446 B1 | 1/2001 | Gerszberg et al. | |
| 6,496,981 B1 | 12/2002 | Wistendahl et al. | |
| 6,725,303 B1* | 4/2004 | Hoguta et al. | 710/106 |
| 6,795,707 B2* | 9/2004 | Martin et al. | 455/446 |
| 6,871,188 B2* | 3/2005 | De Souza | 705/26.8 |
| 7,490,346 B2* | 2/2009 | Alao et al. | 725/151 |
| 7,540,012 B1* | 5/2009 | Herzberg et al. | 725/87 |
| 7,587,323 B2* | 9/2009 | Matz et al. | 705/344 |
| 7,603,684 B1* | 10/2009 | Ellis | 725/39 |
| 7,647,021 B2* | 1/2010 | Moore et al. | 455/41.1 |
| 7,694,319 B1* | 4/2010 | Hassell et al. | 725/34 |
| 7,735,107 B2* | 6/2010 | Ellis et al. | 725/87 |
| 7,904,930 B2* | 3/2011 | Dhodapkar et al. | 725/86 |
| 2001/0005847 A1 | 6/2001 | Wachtel | |
| 2002/0152458 A1* | 10/2002 | Eyer et al. | 725/1 |
| 2003/0060157 A1* | 3/2003 | Henrick | 455/3.04 |
| 2003/0097313 A1 | 5/2003 | Saul et al. | |
| 2003/0196204 A1 | 10/2003 | Thiagarajan et al. | |
| 2004/0083474 A1* | 4/2004 | McKinlay et al. | 717/176 |
| 2005/0086391 A1* | 4/2005 | Chu et al. | 710/1 |
| 2009/0158339 A1* | 6/2009 | Rodriguez et al. | 725/44 |

OTHER PUBLICATIONS

Anon., "MetaTV Deploys Platform for Automation and Optimization," PR Newswire, Feb. 12, 2002.*
Schott, E.R., "Building iSCSI Storage Area Networks," Computer Technology Review, vol. 23, No. 11, pp. 16-17, Nov. 2003.*
Weiss, T.R., "Linux Transfer for Windows Network Administrators" (Abstract), Computerworld, vol. 38, No. 9, p. 31, Mar. 1, 2004.*
International Preliminary Report on Patentability for corresponding PCT Application No. PCT/US05/32567, mailed Jul. 2, 2008, 14 pages.

* cited by examiner

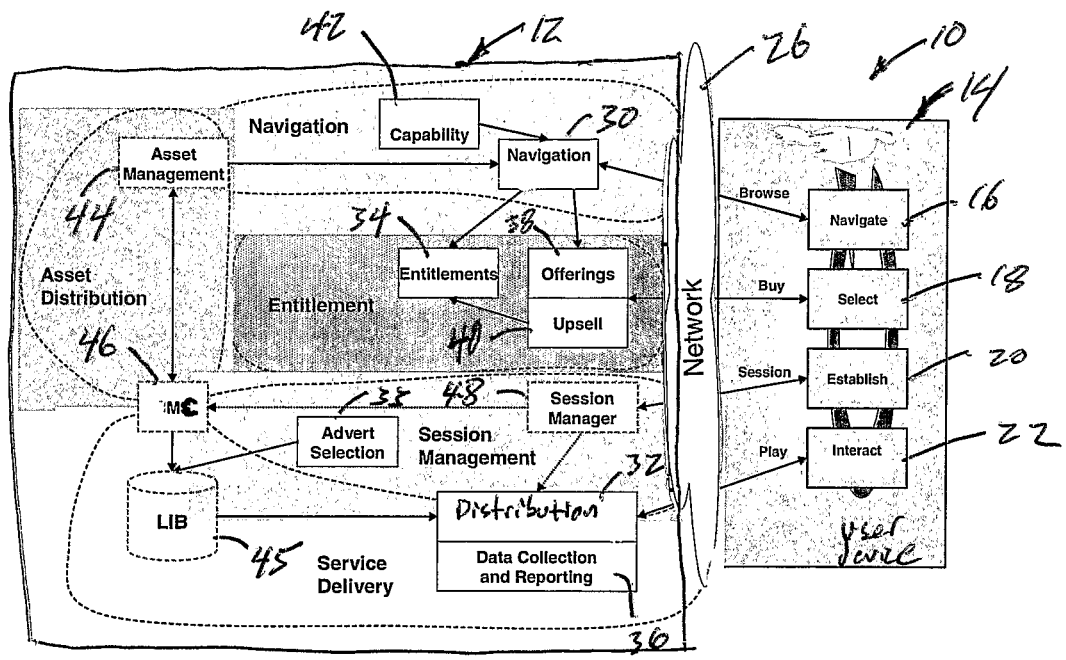

METHOD AND SYSTEM OF MANAGING SUBSCRIBER ACCESS TO SERVICES ASSOCIATED WITH SERVICES PROVIDER

CROSS-REFERENCE TO RELATED APPLICATIONS

The present invention claims the benefit of U.S. provisional application Ser. No. 60/609,384 filed Sep. 13, 2004, the disclosure of which is hereby incorporated in its entirety.

BACKGROUND OF THE INVENTION

1. Field of the Invention

The present invention relates to methods and system of managing subscriber access to services associated with a service provider.

2. Background Art

Service providers, such as cable and television, high speed internet, and other providers, may support a number of services for their subscribers. One problem faced by the service providers relates to managing subscriber access to the various services. The service providers typically provide a menu, user interface, or other feature to present available services to the subscribers for selection and access.

SUMMARY OF THE INVENTION

One non-limiting aspect of the present invention relates to a method of intelligently presenting services to subscribers of a service provider. The method may include collecting information from features located upstream of customer premise equipment used to interface the services with the subscribers, determining a number of services provided by the service provider, providing a user interface to one or more subscriber for use in presenting the services for subscriber access, and determining the presented services as a function of the collected information and available services.

One non-limiting aspect of the present invention relates to a system for use in managing subscriber access to services associated with by a service provider. The system may include subscriber devices having capabilities for interfacing the services with the subscribers, an entitlement feature configured to manage subscriber entitlements, and a navigation feature configured to operate with the subscriber devices in order to present available services to the subscribers so that the subscribers are able to navigate the services for selection.

Optionally, the subscriber entitlements may be used for detailing services entitled to be accessed by the subscribers and the navigation feature may communicate with the entitlement feature to present services entitled to be accessed by the subscribers.

One non-limiting aspect of the present invention relates to a method of managing subscriber access to services. The method may include determining subscriber entitlements to the services and managing presentation of the services for subscriber selection and access as a function thereof.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawing in which:

FIG. 1 illustrates a system for managing subscriber access to services associated with a service provider in accordance with one non-limiting aspect of the present invention.

DETAILED DESCRIPTION OF THE PREFERRED EMBODIMENT(S)

FIG. 1 illustrates a system 10 for managing subscriber access to services associated with a service provider 12 in accordance with one non-limiting aspect of the present invention. The system 10 may relate to any number of service providers, including cable, satellite, and broadcast television providers, high speed and internet service providers, telecommunication providers, and the like.

The services may relate to any number of services associated with the service providers 12. The services may include delivery of television, video, and other media content through cable, satellite, or high speed data infrastructures. The services may relate to applications and other parameters associated with such services, including controlling access to or directing downloading of data associated with video on demand (VOD), pay-per-use, interactive gaming, enhanced or interactive television, digital video recording, video and textual messaging, music/audio communications, and the like.

The system 10 may include a number of user devices 14 for interfacing the services with the subscribers. For exemplary purposes, FIG. 1 illustrates a single user device 14, however, the present invention is not so limited and fully contemplates the use of any number of user devices to support interfacing the services with any number of subscribers. The devices 14 may be associated with customer premise equipment configured to receive, output, and otherwise manipulate cable related signals for use by one or more subscribers. For example, a portion of the user devices may be associated with settop boxes (STBs), modems, cable modems (CMs), computers, digital or personal video recorders (DVRs, PVRs), media terminal adapters (MTAs), mobile media devices (cellular phones, PDAs, etc.) and/or outlet digital adapters (ODAs).

The user device 14 may include a navigation element 16, selection element 18, establishment element 20, and interaction element 22. These elements 16-22 may be used to facilitate subscriber interaction with the service provider 12 and the services associated therewith. The navigation element 16 may be used to facilitate navigation of user interface and other elements used to present services. The selection element 18 may be used to execute selection of services and the like. The establishment element 20 may be used to establish and support communications with the service provider associated support access to the services. The interaction element 22 may be used to control subscriber interaction with the accessed services, such as to control playback of a movie or to facilitate interactive gaming operations.

A network 26 may be provided to electronically communicate signals between the service provider 12 and the user device to facilitate delivery and access by the user device to the services associated with the service provider 12. The network 26 may include any number of options to support signal communications between the service provider 12 and user device 14. The network 26 may include terrestrial and extraterrestrial components and infrastructures, cable lines, telephone lines, and/or satellite or other wireless architectures. The network 26 may be associated with other private and/or public networks, such as the Internet and provider specific private networks. The network 26 may include any number of elements to support the operation thereof and need not necessary be separate from the service provider, as the service provider may be responsible for supporting operation of at least a portion of the network.

Depending on the service provider 12, any number of elements (not shown) may be required to support various services and the interfacing of signals between the elements and user device. For example, a portion of the elements may be associated with signal transmissions such as, but not limited to, routers, hubs, switches, gateways, conditional access routers (CARs), cable modem terminations systems (CMTSs), network provisioning units (NPUs), a call management server, a presence server, a SIP routing proxy, a SIP proxy/registrar server, a PCMM policy server, a bandwidth on demand server, a streaming server caching proxy, a gaming server, a CDN, a media acquisition server, a provider server, a unified messaging server, a SIP feature server, a OSS/BSS, and a global directory server.

The elements, user device 14, and network 26 may be configured to operate according to or support the operation of any number of protocols, applications, and procedures, including applications such as, but not limited to, linear and non-linear television programming (cable, satellite, broadcast, etc.), Video on Demand (VOD), interactive television (iTV), interactive gaming, pay-per-view (PPV), and protocols such as Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, and others.

A number of features may be included within the system 10 to facilitate managing subscriber access to the services. As shown in FIG. 1 and provided throughout this disclosure, certain embodiments may encompass one or more features as an electronic device, including one or more of the disclosed electronic devices, servers, or other apparatuses, comprising a tangible computer-readable medium and a processor. The computers, servers, features or apparatuses may comprise a tangible computer-readable medium comprising computer-executable instructions that when executed by a processor may be configured perform one or more methods in accordance with various embodiments disclosed herein. The features may relate to logically functioning elements, such as software embedded on a tangible computer-readable medium, self or programmable computers and servers, and other elements associated with the service provider 12 that may be used for supporting the operations associated therewith. The features are shown as standalone features assigned to particular portions of the service provider, however, any one or more of the features may be combined into an integrated feature supported by one or more processing units. Further illustrative systems, servers, features, and processing units are disclosed in related U. S. Prov. Pat. App. 60/609,384 filed Sep. 13, 2004, which is incorporated herein by reference in its entirety for any and all purposes.

A navigation feature 30 may be included to facilitate current and future navigation needs. The navigation feature 30 may include a number of logical components operative with other system features to compose lists of services (content) to be presented to the subscriber for access. For example, the navigation feature 30 may be configured to host or otherwise output signals for creating an electronic programming guide (EPG), webpage, or other subscriber accessible user interface/portal, which may be populated with various services for selection by the subscribers.

The navigation feature 30 may be configured to support subscriber specific user interfaces and the presentation of subscriber specific content for selection. In this manner, each subscriber, from any number of subscriber affiliated or non-affiliated user devices, may access the user interface, such as through a VOD platform or a STB supported application, to select the presented services.

The services may be presented in the form of selectable icons, windows, menus or other user navigable features. The services may be arranged according to any number of themes and criteria to facilitate user navigation and selection. For example, if the user device is a STB, the navigation feature may provide an electronic programming guide with a number of selectable buttons which the subscriber can navigate through with a remote control or other device for selection. Once selected, the navigation feature may coordinate access to the desired service.

The present invention is not intended to be limited to presenting the services through an electronic programming guide or other feature accessible through a STB. The present invention fully contemplates the navigation feature supporting access to the services through any number of other user devices, including computers, mobile elements (PDAs, cellular phones, etc) and permitting access to the services to take place through a device communicating with the navigation feature and/or through an auxiliary device associated therewith.

A distribution feature 32 may be included within the system to support signal transmissions with the user device and access to the services, and thereby, access to the services. The distribution feature may be configured for streaming, broadcasting, or otherwise distributing signals associated with the services to the user device. Optionally, the distribution feature 32 may be instructed by the navigation feature 30 to transmit signals to a particular user device 14 and/or the navigation feature 30 may instruct the user device to tune to or otherwise receive signals broadcasted from the distribution feature 32 for locating a particular channel or other output medium.

For example, if the selected service is a movie on demand, the navigation feature 30 may communicate with the distribution feature to determine a channel on which the movie is available, to coordinate downloading of the movie to the user device 14, and/or the navigation or distribution feature 30-32 may communicate signals to the user device 14 for automatically tuning the user to a particular channel showing the movie. The distribution feature 32 may include any number of elements to support one-to-one, one-to-many, and other multicast operations. The distribution feature 32 may also be configured to receive signals from the user device, such as to support interactive applications like and gaming and messaging.

The distribution feature 32 may also coordinate playback and other control of content associated with the selected service. If the selected service is a movie on demand, for example, the distribution feature may coordinate playback of the movie and other controls associated therewith, such as pause, fast-forward, rewind, etc. In addition, the distribution feature 32 may coordinate with an advertisement feature 33 to include advertisements with the service and/or a data collection and reporting feature 36 to manage billing associated with use of the service and to adjust or limit the selected service according to user preferences of the subscriber, i.e. to require parental or personal identification number (PIN) control. In one embodiment, reporting feature 36 or other components shown in the FIG. 1 may comprise a reporting server. A reporting server may be any electronic device comprising a computer-readable medium and a processor. In certain embodiments, a reporting server is integrated within another electronic device with another feature, server, or electronic device. A reporting device may comprise a tangible computer-readable medium comprising computer-executable instructions that when executed by a processor may be configured to receive user device configuration data from one or more user devices, such as user device 14 shown in FIG. 1. The user device configuration data may be received through one or more network interfaces, including portions of network 26. In various embodiments, the configuration data may comprise diagnostic data and state data collected from two different user devices. The two user devices may be disparate electronic devices, such that a first user device operates under a first native operating system and the second user device operates under a second operating system.

Optionally, the distribution feature 32 may be instructed by the navigation feature 30 to include other services with the currently accessed services. As described below in more detail, an entitlement feature 34 may indicate entitlements to messaging, gaming, and other services entitled to be accessed by the subscriber. Based on these entitlements, the navigation feature 30 may instruct the distribution feature 32 to integrate other services with the currently accessed service, such as to include interactive messaging and advertisements. The ability to cross-reference entitlements may be advantageous in intelligently marketing services, offers, advertisements, and other content controls.

The entitlements feature 34 may be included to support management of subscriber rights in particular content and services. The subscriber entitlements generally relate to indicators or other parameters defining subscriber entitlements to services. The right to access certain services may be specified in subscriber agreements or through other mechanisms provided by the service provider. Optionally, the entitlement may be based on agreements with vendors associated with the service, such as a movie studio associated with a particular movie available on demand.

One type of entitlement may be a subscription based entitlement, such as a subscription to a premium movie channel whereby the subscriber is entitled to watch movies associated with the particular movie channel or suite of movie channels and to access other information, such as webpages and special features associated therewith. Similar entitlements may relate to a gaming packages and other interactive packages where a subscriber pays to play or download a number of multimedia games or other interactive content. The entitlement may be based on pay-per-use or pay-per-lot arrangement (time, unit, etc.).

Another type of entitlement may relate to cross-platform entitlements where the subscriber is able to access services associated with different aspects of the service provider. For example, the service provider may provide high speed data and video on demand services over different platforms. The cross-platform entitlements may be used to permit the subscriber to order and view movies on demand through a high speed data platform accessible by their computer as opposed to limiting viewing to orders made through a STB or other unit not associated with the high speed data platform.

Another type of entitlement may relate to messaging entitlements, such as those associated with instant, video, and textual messaging. These entitlements may be specify messaging services the subscriber can use for communications. Optionally, these entitlements may be used to integrate messaging options with other services provided by the service provider. For example, if the subscriber is entitled to instant messaging services, the entitlement feature 34 may indicate the entitlement to other system features so that instant messaging may be include therewith, such as to include instant messaging during viewing of a football game or movie.

Any number of entitlements may be monitored and kept track of with the entitlements feature 34. The entitlement feature 34 may include a memory or other data storage feature for storing entitlements associated with the subscribers. In one embodiment, entitlements feature 36 or other components shown in the FIG. 1 may comprise an entitlement server. An entitlement server may be any electronic device comprising a computer-readable medium and a processor. In certain embodiments, an entitlement server may be integrated with another feature, server, or electronic device, including those disclosed herein. In one embodiment, an entitlement server or component may comprise a tangible computer-readable medium comprising computer-executable instructions that when executed by a processor may be configured to obtain the entitlement information through communications with other system features, such as a billing feature 36, used to track customer bills and subscriptions or an enrollment system (not shown) used to enter subscriber information and profiles, and/or it may be independently programmed through by a programmer or through signals communicated thereto from the user device, such as during a login operation or other similar bi-directional operation. In one embodiment, upon receiving an indication of a user selection selecting an offering from a plurality of offerings for a user device, such as user device 14, an entitlement server or other component may be configured to update entitlement information associated with the user device 14 to permit the reception of the selected offering.

The navigation feature 30 may be configured to communicate with the entitlement feature 34 to assess entitlements associated with particular subscribers. The navigation feature 30 may select the services presented to the subscribers as a function of the subscriber entitlements. In this manner, the navigation feature 30 can optionally control the services present to the subscribers so that one or more of the presented services are entitled to be accessed by the subscriber.

An offerings feature 38 may be included to specify services presented to the subscribers through the navigation feature 30. The offering feature 38 may include information on all offers available from the service provider for all services associated therewith. The offers may periodically change according to market influences and special offers and/or with upgrades and changes in services provide by the service provider. The navigation feature 30 may communicate with the offering feature 38 to determine the available offers and to coordinate the services presented as a function thereof. In one embodiment, offerings feature 38 or other components shown in the FIG. 1 may comprise an offerings server. An offerings server may be any electronic device, or portion thereof, comprising a computer-readable medium and a processor. In certain embodiments, an offerings server may be integrated with another feature, server, or electronic device, including those shown in FIG. 1. An offerings device may comprise a tangible computer-readable medium comprising computer-executable instructions that when executed by a processor may be configured to receive metadata relating to reception of a plurality of media offerings available for one or more user devices, such as user device 14 shown in FIG. 1. In one embodiment, a first plurality of media offerings may be available for reception on a first user device and a second plurality of offerings available for reception on a second user device. In certain embodiments, the metadata relating to the first and the second plurality of offerings may include information relating to: rules for eligibility to participate, the mechanics to apply the offering, disposition rules when a time limited offering expires, and combinations thereof. Further, offerings server 38 and/or other electronic devices having a processor may be configured to process user device configuration data and/or the user entitlement data. For example, in one embodiment, configuration data and/or user entitlement data may be utilized to determine eligibility of at least one of the user devices to receive an offer from the respective plurality of offerings. In one embodiment, at least a portion of the metadata is received from an offering server and the offerings information is associated with entitlement information from an entitlement server.

The navigation feature 30 may analyze the services entitled to be accessed by the subscriber against the available offerings and select presented offers (advertisements, movies, special features, etc.) to correspond with those entitled to be accessed by the subscriber. Optionally, the navigation feature 30 may select one or more offers associated with non-entitled services for presentation. The non-entitled offers may relate to packages and other entitlements available to the subscribers for purchase and/or other promotional items, such as advertisements, which may be selected for viewing, download, etc.

The offering feature 38 may further specify parameters for governing at least one of subscriber eligibility, mechanisms for apply the offers, and rules for controlling offer disposition. The subscriber eligibility is analogous to subscriber entitlements and may be used to restrict certain offers to particular subscribers based on the subscribers eligibility, such as age, ethnicity, user preference, etc. The mechanisms for apply the order may include user authentication, coupon usage, and other controls associated with applying the offers. The rules for controlling offer disposition may specify a temporal restriction on how long an offer may be valid, limits on use of services associated with the offered service, and the like. One or more features, servers and/or electronic devices, including offering server or feature 38 may comprise a transaction server or component. In one embodiment, a transaction server or component may comprise a tangible computer-readable medium comprising computer-executable instructions that when executed by a processor may be configured to receive data indicative of a user input to receive an offering from a plurality of offerings available for reception. In one embodiment, state data associated with a user device, such as user device 14, may altered to permit the automated reception of the selected offering.

An upsell feature 40 may be included for specifying offers to be presented through the navigation feature 30 as a function of entitlements associated with the subscribers. The upsell feature 40 may be configured to interact with the entitlement feature 34 and other system features, such as the data collection and reporting feature 36 used to monitor subscriber usage of particular services and/or other subscriber viewing habits. The intelligence collected from these features may then be used to coordinate particular offers to the subscribers. In one embodiments upsell feature 40 or other components shown in FIG. 1 may comprise an upsell server. An upsell server may be any electronic device, or portion thereof, comprising a computer-readable medium and a processor. In certain embodiments, an upsell server may be integrated with another feature, server, or electronic device, including those shown in FIG. 1. An upsell server or device may comprise a tangible computer-readable medium comprising computer-executable instructions that when executed by a processor may be configured to integrate data from a plurality of disparate applications wherein at least one application relates to a managed content entitlement and at least a second application relates to a video on demand entitlement.

The upsell aspect of the upsell feature 40 may relate to coordinating presentation of offers associated with historical subscriber usage and viewing habits. The upsell feature 40 may intelligently decided which offers associated with the subscriber are likely to be accepted for purchase based on historical usage or other indicators derived from past viewing habits. This may include specifying offers associated with the current entitlements of the subscriber and/or specifying offers for non-entitled services in the hopes of enticing the subscriber to purchase new entitlements.

A capabilities feature 42 may be included for specifying capabilities of the user devices to support particular services. The capabilities feature 42 may communicate the capabilities of particular user devices to the navigation feature 30 for use by the navigation feature 30 in presenting services suitable to the capabilities of the user devices of the subscribers to which the services are presented. This may be advantageous in parsing the presentation services to correspond with current hardware and software capabilities of the user device being used by the subscriber, i.e., when a particular subscriber has multiple entitlements and attempts to accessing services from different user devices it may be helpful to limit the presented services to those that are supported by the hardware and software capabilities of the current user device.

The capabilities feature 42 may communicate with user devices directly and/or other system features to ascertain the hardware and software requirements thereof. For example, OOB messaging may be used to communicate with or periodically poll the user devices for their currently configurations, capabilities, and settings. Likewise, the capabilities feature 42 may consult back-office support features and operational (IT) guides to determine current configurations, capabilities, and setting for the user devices.

An asset management feature 44 may be included for specifying assets available for supporting particular services. The asset management feature 44 may communicate the availability of particular assets, such a video demand and high speed data platforms, to the navigation feature 30 for use by the navigation feature 30 in presenting services having sufficient assets (hardware, memory, processing, etc.) to support access thereto. This may be advantageous to limiting the presentation of services that are currently available from the service provider based on system constraints and other operational and commercial limitations.

The asset management feature 44 may be used to determine the availability of so call 'non-hardware' assets, such as content based assets like movies, television programs, digital pictures, movies, audio clips, etc. The asset management server may communicate with a library 45 server in an effort to determine the status of these assets. The library server may include a current library of available content and other features associated with supporting services requiring content to be delivered to the subscribers, such as messaging and video on demand operations. The library may be periodically updated and monitored to reflect changes in content and the addition of new releases and other content updates.

The library 45 may be linked with a media center feature 46 to facilitate access and search of available content. The media center feature 46 may be regionally located enterprises or entity associated with programming and scheduling content for playback and delivery. The media center feature 46 may also be associated with the distribution feature 32 to support channel allocation and to facilitate other controls associated with interfacing services with the user device 14.

A session manager feature 48 may be included to facilitate individual communications with the user device 14. The session manager feature 48 may communicate through OOB messages, DOCSIS messages, IP messages, and any number of other mediums to facilitate communications with the user device 14, depending on the particular capabilities thereof. The session manager feature 48 may operate in conjunction with the media center 48 and the distribution feature 32 to facilitate interfacing services with the user device 14.

As described above, the present invention provides an intelligent system for coordinating presentation and selection of subscriber services based on information gleaned from a number of features associated with supporting the services and other operations associated with the service provider. The present invention enables a service provider to securely manage subscriber information at upstream locations operating independently of the user device associated with the subscriber so as to allow the service provider to intelligently and securely integrate entitlements, viewing habits, offers, upselling, and other information associated with the subscribers and to coordinate the information into enhanced services presentation and customer support.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A computer-implemented method comprising:
   receiving, during a first time period, user device configuration data comprising diagnostic data and state data collected from a first user device;
   receiving, during the first time period, user data comprising user entitlement data for the first user device;
   receiving, during a second time period, user device configuration data comprising diagnostic data and state data collected from a second user device;
   receiving, during the second time period, user data comprising user entitlement data for the second user device;
   receiving metadata relating to a first plurality of media offerings available for reception on the first user device and a second plurality of media offerings available for reception on the second user device;
   processing the user device configuration data and the user entitlement data from the first user device and the second user device with a processor to determine eligibility of at least one of the user devices to receive an offer from the respective plurality of media offerings; and
   upon receiving an indication of a user selection selecting a media offering from the plurality of media offerings for a user device, updating entitlement information associated with the user device to permit reception of the selected media offering through an operating system agnostic platform.

2. The computer-implemented method of claim 1, wherein the metadata relating to the first and the second plurality of media offerings includes rules for eligibility to participate, mechanics to apply the offering, disposition rules when a time limited offering expires, or combinations thereof.

3. The computer-implemented method of claim 1, wherein the eligibility further considers user data.

4. The computer-implemented method of claim 1, wherein upon receiving the indication of the user selection selecting the media offering from the plurality of media offerings for the user device, the method further comprises:
   automatically modifying the state data associated with the user device to permit an automated reception of the selected media offering.

5. The computer-implemented method of claim 1, wherein the receiving metadata relating to the plurality of media offerings comprises receiving the metadata from an offering server and wherein the offering server comprises computer-executable instructions that when executed by a processor, perform at least:
   associating offering information with entitlement information from an entitlement server.

6. The computer-implemented method of claim 5, further comprising:
   integrating, by an upsell server, data from a plurality of disparate applications, wherein at least one application relates to a managed content entitlement and at least a second application relates to a video on demand entitlement.

7. The computer-implemented method of claim 1, wherein the first plurality of media offerings comprises both a first service and a second service;
   wherein the first service has not previously been selected for access by the first user device and is accessible without being separately authorized due to the first user device being previously entitled to access the first service;
   wherein the second service is inaccessible to the first user device without being separately authorized due to the first user device not being currently entitled to access the second service; and
   wherein the method further comprises:
   transmitting information configured to present the offered first and second services to a user to navigate the first and second services for selection.

8. The computer-implemented method of claim 1, wherein the first plurality of media offerings comprise both a first service and a second service;
   wherein the first service has not previously been selected for access by the first user device and is accessible without being separately authorized due to the first user device being previously entitled to access the first service;
   wherein the second service is inaccessible to the first user device without being separately authorized due to the first user device not being currently entitled to access the second service; and
   wherein the method further comprises:
   transmitting information configured to present the offered first and second services to a user to navigate the first and second services for selection.

9. A computer-implemented method comprising:
   receiving, during a first time period, user device configuration data collected from a first user device comprising diagnostic data and state data;
   receiving, during a second time period, user device configuration data collected from a second user device;

receiving user data comprising usage data from the first and second user devices;

receiving metadata relating to a first plurality of media offerings available for reception on the first user device and a second plurality of media offerings available for reception on the second user device;

using the user device configuration data in a determination of eligibility of at least one of the user devices to receive an offer from the respective plurality of media offerings; and upon receiving an indication of a user selection selecting an offering from the plurality of media offerings for a user device, updating entitlement information associated with the user device to permit reception of the selected offering through an operating system agnostic platform.

10. The computer-implemented method of claim 9, wherein the metadata relating to the first and the second plurality of media offerings includes information from: rules for eligibility to participate, mechanics to apply the media offerings, disposition rules when a time limited offering expires, or combinations thereof.

11. The computer-implemented method of claim 9, wherein upon receiving the indication of the user selection selecting the offering from the plurality of media offerings for the user device, the method further comprises:

automatically modifying the state data associated with the first user device to permit an automated reception of the selected offering.

12. The computer-implemented method of claim 9, wherein the receiving metadata relating to the plurality of media offerings comprises receiving the metadata from an offering server and wherein the offering server comprises computer-executable instructions that when executed by a processor, perform at least:

associating offering information with entitlement information from an entitlement server.

13. The computer-implemented method of claim 12, further comprising:

integrating, by an upsell server, data from a plurality of disparate applications, wherein at least one application relates to a managed content entitlement and at least a second application relates to a video on demand entitlement.

14. A non-transitory computer-readable medium comprising computer-executable instructions that when executed by a processor, cause the processor to perform at least:

receiving, during a first time period, user device configuration data comprising diagnostic data and state data collected from a first user device;

receiving, during the first time period, user data comprising user entitlement data for the first user device;

receiving, during a second time period, user device configuration data comprising diagnostic data and state data collected from a second user device;

receiving, during the second time period, user data comprising user entitlement data for the second user device;

receiving metadata relating to a first plurality of media offerings available for reception on the first user device and a second plurality of media offerings available for reception on the second user device;

processing the user device configuration data and the user entitlement data from the first user device and the second user device with the processor to determine eligibility of at least one of the user devices to receive a media offer from the respective plurality of media offerings; and upon receiving an indication of a user selection selecting a media offering from the plurality of media offerings for a user device, updating entitlement information associated with the user device to permit reception of the selected media offering through an operating system agnostic platform.

15. The computer-readable medium of claim 14, wherein the metadata relating to the first and the second plurality of media offerings includes rules for eligibility to participate, mechanics to apply the media offering, disposition rules when a time limited media offering expires, or combinations thereof.

16. The computer-readable medium of claim 14, wherein the eligibility further considers user data.

17. The computer-readable medium of claim 14, further comprising computer-executable instructions that when executed by the processor, further cause the processor to perform at least:

upon receiving data indicative of a user input to receive the media offering from the first or second plurality of media offerings, automatically modifying the state data associated with the user device to permit an automated reception of the selected media offering.

18. The computer-readable medium of claim 14, wherein the receiving metadata relating to the plurality of media offerings comprises receiving the metadata from an offering server configured to associate offerings information with entitlement information from an entitlement server.

19. The computer-readable medium of claim 14, further comprising:

integrating, by an upsell server, data from a plurality of disparate applications, wherein at least one application relates to a managed content entitlement and at least a second application relates to a video on demand entitlement.

20. The computer-readable medium of claim 14, wherein the media offerings comprises both a first service and a second service in which the first service has not previously been selected for access by the first user device and is accessible without being separately authorized due to the first user device being previously entitled to access the first service and the second service is inaccessible to the first user device without being separately authorized due to the first user device not being currently entitled to access the second service; and wherein the computer-readable medium comprises computer-executable instructions that when executed by the processor, cause the processor to perform at least:

transmitting information configured to present the first and second services to a user to navigate the first and second services for selection.

* * * * *